United States Patent
Wang et al.

(10) Patent No.: US 7,561,586 B2
(45) Date of Patent: Jul. 14, 2009

(54) METHOD AND APPARATUS FOR PROVIDING NETWORK VPN SERVICES ON DEMAND

(75) Inventors: Guo-Quiang Wang, Kanata (CA); Ravi Ravindran, Ottawa (CA); Min Xia, Kanata (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 908 days.

(21) Appl. No.: 10/666,529

(22) Filed: Sep. 19, 2003

(65) Prior Publication Data

US 2005/0063411 A1    Mar. 24, 2005

(51) Int. Cl.
H04L 12/28 (2006.01)
H04L 12/56 (2006.01)
H04J 3/16 (2006.01)
H04J 3/22 (2006.01)
H04J 3/12 (2006.01)

(52) U.S. Cl. .............. 370/401; 370/467; 370/522
(58) Field of Classification Search ......... 370/400–401, 370/522
See application file for complete search history.

(56) References Cited

U.S. PATENT DOCUMENTS

| | | | | |
|---|---|---|---|---|
| 6,795,430 | B1 * | 9/2004 | Ong et al. ................... | 370/352 |
| 7,072,346 | B2 * | 7/2006 | Hama ..................... | 370/395.53 |
| 7,394,811 | B2 * | 7/2008 | Gibson et al. .............. | 370/392 |
| 2002/0041590 | A1 * | 4/2002 | Donovan .................... | 370/352 |
| 2002/0131576 | A1 * | 9/2002 | Lampola ..................... | 379/229 |
| 2002/0141381 | A1 * | 10/2002 | Gawargy et al. ............. | 370/352 |
| 2003/0033518 | A1 * | 2/2003 | Faccin et al. ................. | 713/153 |
| 2003/0110292 | A1 * | 6/2003 | Takeda et al. ............... | 709/245 |
| 2004/0028080 | A1 * | 2/2004 | Samarasinghe et al. ..... | 370/486 |

OTHER PUBLICATIONS

M. Handley, et al., *SDP: Session Description Protocol*, Internet Engineering Task Force (IETF) Request For Comments (RFC) 2327, Apr. 1998.
E. Rosen, et al., *BGP/MPLS VPNs*, IETF RFC 2547, Mar. 1999.
J. Rosenberg, et al., *SIP: Session Initiation Protocol*, IETF RFC 3261, Jun. 2002.

* cited by examiner

*Primary Examiner*—Kevin C Harper
(74) *Attorney, Agent, or Firm*—Anderson Gorecki & Manaras LLP (57) ABSTRACT

A S-VPN gateway provides a signaling gateway to integrate SIP signaling and UNI/NNI signaling, and manage the mapping between SIP sessions and VPN connections. The mapping relationship reflects the access of user applications to the specific VPN tunnels, multiplexing of media service sessions to VPN tunnels, VPN service creation, service duration, VPN QoS, VPN service life cycle management, and VPN service charge based on a per-service-usage. The S-VPN gateway also provides VPN access policy/security management (i.e., inter-domain AAA process), VPN membership auto-discovery, service auto-discovery, network resource auto-discovery, address resolution service for both SIP and VPN naming space, VPN service mobility, and SLA management. The S-VPN gateway enables network VPN tunnels to be created in advanced and accessed on-demand, for example by enterprise VPN applications such as GRID applications, through a SIP interface.

13 Claims, 4 Drawing Sheets

METHOD AND APPARATUS FOR PROVIDING NETWORK VPN SERVICES ON DEMAND

BACKGROUND OF THE INVENTION

1. Field of the Invention

The present invention relates to communication networks and, more particularly, to a method and apparatus for providing network VPN services on demand.

2. Description of the Related Art

Data communication networks may include various computers, servers, nodes, routers, switches, hubs, proxies, and other devices coupled to and configured to pass data to one another. These devices will be referred to herein as "network devices." Data is communicated through the data communication network by passing data packets (or data cells or segments) between the network devices by utilizing one or more communication links. A particular data packet may be handled by multiple network devices and cross multiple communication links as it travels between its source and its destination over the network.

The various network devices on the communication network communicate with each other using predefined sets of rules, referred to herein as protocols. Different protocols are used to govern different aspects of the communication, such as how signals should be formed for transmission between network devices, various aspects of what the data packets should look like, and how packets should be handled or routed through the network by the network devices.

A secure path through an untrusted network (referred to herein as "network VPN") may be formed by securing communication resources between two or more networks or network devices to form a VPN tunnel, such as by encrypting or encapsulating transmissions between the networks or network devices. Using VPN tunnels over a public network such as the Internet enables information to be exchanged securely between geographically dispersed sites without obtaining dedicated resources through the public network.

To enable devices on one network VPN site to communicate with devices on another network VPN site via the network VPN tunnel, it is necessary to exchange routing information between the two network VPN sites and with the network devices that will handle the traffic on the tunnel. Likewise, as network devices are added and removed from the networks, or as problems are encountered and fixed in the networks, the routing tables need to be updated and advertised to the other participating sites in the network VPN.

One commonly utilized method of establishing network VPN tunnels is described in Internet Engineering Task Force (IETF) Request For Comments (RFC) 2547, the content of which is hereby incorporated herein by reference. RFC 2547 describes a network VPN architecture in which MultiProtocol Label Switching (MPLS)-based tunnels are used to forward packets over a MPLS communication network. An instance of Border Gateway Protocol (BGP) is used to distribute routes over the MPLS communication network for all network VPNs provisioned through a particular Provider Edge (PE) network device. Routing information for each network VPN serviced by a PE is stored in a separate network VPN routing and forwarding table (VRF) or a distinguishable area of the PE's common VRF.

A separate, but to date unrelated technology, referred to herein as Enterprise Virtual Private Networks (Enterprise VPNs), has also been developed to enable geographically diverse applications to share resources. Enterprise VPNs may be used, for example, to share computational resources, storage resources, programs, and database resources. Enterprise networks focus on application-related issues, such as distributed workflow logic and resource management, coordinated fail-over between participants, problem determination, Quality of Service (QoS), and common security semantics. Several examples of enterprise VPNs include emerging technologies like GRID services and Web services.

Since Enterprise VPNs are generally formed from geographically dispersed network resources, those network resources must be connected to exchange data. To secure data as it is passed between the Enterprise VPN participants, it would be desirable to be able to connect the Enterprise VPN participants using network VPNs. Accordingly, it would be desirable to have an interface between network VPNs and enterprise VPNs to enable network VPN services to be provided on demand.

SUMMARY OF THE INVENTION

The present invention overcomes these and other drawbacks by providing a method and apparatus for enabling enterprise VPNs to integrate with network VPNs by providing network VPN services on demand. According to one embodiment of the invention, a service VPN (S-VPN) gateway integrates SIP signaling between applications and network VPN UNI and NNI signaling to enable applications to use SIP signaling to invoke network VPN resources. The S-VPN also manages the mapping between SIP signaling and network VPN to manage network VPN resources on behalf of the enterprise VPN applications. The mapping relationship reflects the access of user applications to the specific VPN tunnels, multiplexing of media service sessions to VPN tunnels, VPN service creation, service duration, VPN QoS, VPN service life cycle management, and VPN service charge based on a per-service-usage. The S-VPN also provides VPN access policy/security management (i.e., inter-domain AAA process), VPN membership auto-discovery, service auto-discovery, network resource auto-discovery, address resolution service for both SIP and VPN naming space, VPN service mobility, and SLA management. The S-VPN enables network VPN tunnels to be created in advanced and accessed on-demand, for example by enterprise VPN applications such as GRID applications, through a SIP interface.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

As described in greater detail below, a Service Virtual Private Network (S-VPN) gateway enables enterprise VPN applications to access network VPN resources on demand without requiring the enterprise VPN applications to manage the network VPN resources. According to one embodiment of the invention, the S-VPN gateway integrates SIP signaling with network VPN UNI/NNI signaling to enable enterprise VPN applications to use SIP signaling to obtain network VPN resources. This allows enterprise VPN applications to use familiar SIP signaling to obtain access to network VPN resources without understanding the nature or details associated with the network VPN resources. Accordingly, accessing network VPN resources can be as simple (to the enterprise VPN application) as establishing a VoIP call.

According to one embodiment of the invention, integrating enterprise VPNs and network VPNs is performed through a combination of two logical events. First, network VPN tunnels (label switched paths (LSPs)) are established through a Multi-Protocol Label Switched network interconnecting the participants in the enterprise VPN. Second, resources on the network VPN tunnels are reserved to handle traffic between the participants in the enterprise VPN so that traffic may be passed between the participants. These events may occur in a relatively contemporaneous manner so that a given exchange/request can be used to both establish a network VPN tunnel and reserve resources through the tunnel so that the network VPN tunnel may be used directly thereafter. Alternatively the tunnels may be established so that they are available, and utilized as necessary by the enterprise VPN participants. The invention is not limited to using tunnels directly after they are created, or to waiting a predetermined period before the tunnels are utilized. Each of the parts of the process—setting up the tunnels and utilizing the tunnels will be explained below.

In the following discussion, it is assumed that the network that will handle the traffic for the network VPN is a Multi-Protocol Label Switched (MPLS) network and that the network VPN tunnels will be Label Switched Paths (LSPs) through the MPLS network. While this example will be used to explain one or more embodiments of the invention, the invention is not limited to operation on an MPLS network. Rather, the invention may be employed in any communication network.

Establishing Network VPN Tunnels

Figure 1:
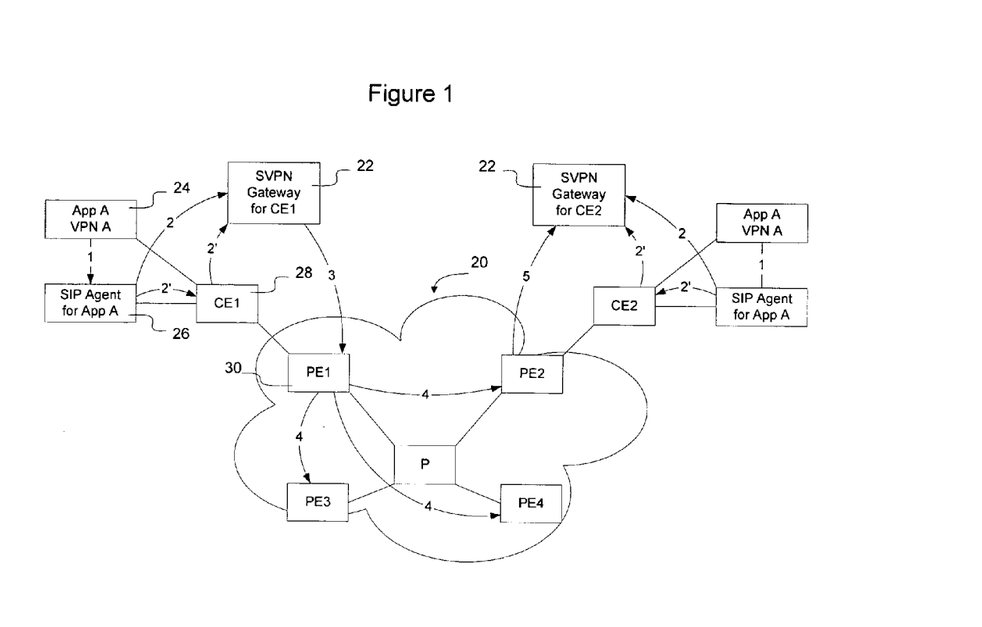
FIG. 1 is a functional block diagram of an example of a communication network including S-VPN gateways and illustrating the operations performed in establishing network VPN tunnels according to an embodiment of the invention.

FIG. 1 illustrates an example network 10 including S-VPN gateways 22 according to an embodiment of the invention. The invention is not limited to the network illustrated in FIG. 1. In FIG. 1, several arrows are used to show the exchange of information between participants in the network. Other exchanges are possible as well, and the invention is not limited to an embodiment utilizing all of these or only these particular exchanges of information.

As shown in FIG. 1, when an enterprise VPN application 24 wishes to join a network VPN, it must first register its association on the network 20. In the following discussion, it will be assumed that the enterprise VPN application knows the VPN-ID of the network VPN it wishes to join. If the application does not know the VPN ID, the S-VPN may be used to discover that information on behalf of the application using VPN and network resource discovery protocols.

To register its association with a particular network VPN, the enterprise VPN application 24 transfers the VPN-ID to its associated SIP agent 26. The registration process is illustrated by arrow (1) in FIG. 1. In this registration process, the application provides the SIP agent with its application-specific address, such as URL or IP address, the VPN ID of the VPN to which it would like access, and the identity of the Customer Edge (CE) network device 28 to which it attaches when it access resources external to the LAN on which it is operating. Optionally, the CE network device may register a portion of this information with the SIP user agent on behalf of the application. In the illustrated embodiment, the CE network device 22 associated with enterprise VPN application A has been designated "CE1."

Upon receipt of this information, the SIP agent 26 registers the enterprise VPN application address, VPN-ID, and CE-ID with a S-VPN gateway 22 associated with CE1. This exchange is designated by arrow (2) in FIG. 1.

The S-VPN gateway 22 distributes the CE-ID and VPN-ID to associated Provider Edge (PE) network device(s) 30. In an MPLS network, Multi-Protocol Border Gateway Protocol (MP-BGP) may be used to distribute CE-VPN membership information to the PE network device attached to the CE network device. This exchange is illustrated by arrow (3) in FIG. 1. MP-BGP enables BGP to carry routing information for multiple network layer routing protocols, e.g. IPv6, IPX, VPN-IPv4, and other similar protocols. The invention is not limited to this embodiment, but rather extends to all routing protocols that may be used to exchange routing information between the PE network devices and between the S-VPN gateway 22 and PE network devices 30.

The PE network device 30 (PE1) exchanges (arrow 4) this new route information throughout the MPLS domain. The other PE network devices 30 will import the route into their routing tables in a known fashion. The route information may also be passed to the other S-VPNs (arrow 5). The service provider uses the routing information and VPN-ID information to set up VPN tunnels throughout the network 20. Where one of the participants in the network moves, re-registration with a S-VPN at the new location causes the associated VPN tunnels to be redirected to the new location. Accordingly, the S-VPN is able to support VPN mobility.

Use of Network VPN Resources

Once the enterprise VPN application has registered its identity, location, and VPN-ID with its associated S-VPN gateway, and this information has propagated through the communication network so that network VPN tunnels have been set up, the enterprise VPN application is now able to obtain and utilize network VPN resources associated with the registered VPN-ID on demand. In the following discussion, it will be assumed that RSVP-TE (Reservation Protocol—Traffic Engineering) will be used to establish LSPs through the MPLS core over IETF RFC 2547-based VPN tunnels and that LDP will be used to distribute labels over these tunnels. The invention is not limited to this particular embodiment as other protocols may be used to reserve bandwidth on the network VPN tunnels.

Figure 2:
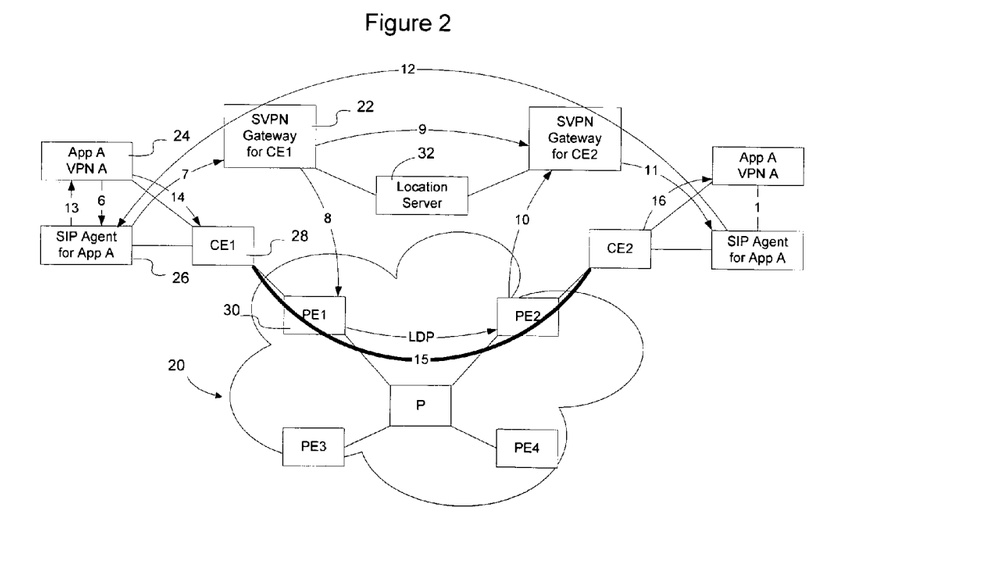
FIG. 2 is a functional block diagram of an example of a communication network including S-VPN gateways and illustrating the operations performed in utilizing network VPN tunnels according to an embodiment of the invention.

FIG. 2 illustrates an example of how an enterprise VPN application may obtain network VPN resources associated with a registered VPN-ID. In the following discussion, it will be assumed that Session Initiation Protocol (SIP) is being used to initiate a transmission session between an enterprise VPN application at a first site and an enterprise VPN application at a second site. SIP is an IP telephony signaling protocol developed by the Internet Engineering Task Force (IETF) and described in IETF Request For Comments (RFC) 3261; the content of which is hereby incorporated herein by reference. SIP has conventionally been primarily used to set up voice over IP calls, however it can also be used to set up data exchanges. SIP is a text-based protocol that is based on HTTP and MIME, which is designed for real-time transmissions and is considerably less complex than H.323 (although the invention does not preclude the use of H.323 instead of SIP). SIP uses an URL addressing scheme and is human readable (e.g. sip:vpn1@nortel.com). SIP relies on the session description protocol (SDP) which is described in RFC 2327, the content of which is herein incorporated by reference. Although embodiments of the invention will be described as using SIP, the invention is not limited to using SIP to initiate a session between the sites as other protocols, such as H.323, may be utilized as well.

As shown in FIG. 2, when an application 24 associated with network VPN A is required to transmit data to or receive data from another enterprise VPN site, it issues a request to the SIP agent 26 indicating the VPN-ID and VPN transmission parameters, such as the required bandwidth, quality of service, priority, duration, time to start, and other pertinent parameters (arrow 6). Optionally, the VPN-ID may be supplied by the SIP agent where the application is only a member of one VPN.

The SIP agent 26 sends a SIP Invite message (arrow 7) to the S-VPN gateway 22. The SIP Invite message may contain the VPN-ID and one or more of the VPN transmission parameters, or optionally additional VPN transmission parameters.

Upon receipt of the SIP Invite message, the S-VPN gateway may evaluate the requested transmission in view of a service level agreement in place with the application, as well as current traffic conditions when deciding whether to provide the requested VPN services. Optional services that may be provided by the S-VPN gateway are discussed in greater detail below in connection with FIG. 3.

The S-VPN gateway interfaces (arrow 8) the PE(s) associated with CE1 to reserve bandwidth on the network on behalf of the enterprise VPN application 24. Specifically, according to one embodiment of the invention, the S-VPN gateway uses User to Network Interface (UNI) signaling to interface with PE1 to cause PE1 to add a VPN session to the network VPN tunnel associated with the VPN-ID. One way of adding a session to a network VPN tunnel is to use Reservation Protocol (RSVP) to reserve bandwidth and to enable traffic engineering to take place on the Label Switched Path (LSP) forming the network VPN tunnel, and to use Label Distribution Protocol (LDP) to distribute LSP labels over the LSP through the MPLS network.

One fundamental concept in MPLS is that two label switched routers (such as the PE network devices) must agree on the meaning of the labels used to forward traffic between and through them. A label distribution protocol is a common set of procedures that may be used by a label switched router (LSR) to inform other LSRs of label bindings it has made. Specifically, the protocol referred to as Label Distribution Protocol (LDP) is used by LSRs to distribute labels to support MPLS forwarding along normally routed paths.

Where RSVP is used to establish routes through the network core, which is useful for traffic engineering, LDP can be utilized to establish LSPs through the LSPs established by RSVP. When a router is configured to run LDP across RSVP-established LSPs, LDP will automatically establish sessions with the router at the other end of the LSP. LDP control packets are routed hop-by-hop, rather than carried through the LSP. This allows the use of simplex (one-way) traffic-engineered LSPs. Traffic in the opposite direction flows through LDP-established LSPs that follow unicast routing rather than through traffic-engineered tunnels.

The PE adds the LDP connection to the VPN tunnel (connection multiplexing) and forwards the LDP call to the destination PE. In this manner, an LSP is established between the PEs. The destination PE will set up a connection with the destination CE and forward the LDP call to the next SVPN server. Although specific protocols have been described in connection with explaining the operation of how a session may be added to a network VPN tunnel, the invention is not limited to use of these particular protocols to exchange labels and reserve bandwidth through the network as other protocols may be utilized as well.

The S-VPN gateway server also issues an invite (arrow 9) to the SIP agent of the second application. If the second application is not associated with the same S-VPN gateway, the SIP Invite is passed to the associated S-VPN gateway for the second application. Where the S-VPN gateway is not known to the S-VPN gateway for the first application, the S-VPN gateway will resolve the address by interfacing a location server 32 in a manner consistent with the SIP protocol specification.

Where a single S-VPN gateway is used to establish a network VPN between two sites, it will wait for the end PE device (PE2) to respond with the LDP call setup message (10). Where there are two or more S-VPN gateways involved, as in the embodiment illustrated in FIG. 2, the second S-VPN will receive the SIP invite (9) and wait to receive the LDP call setup message (10).

Upon receipt of both the SIP Invite and the LDP call setup message, the S-VPN gateway issues a SIP Invite (11) to the SIP agent for the second application. If the second application is available to participate in the transaction, it issues a SIP OK (arrow 12) which is handled by the S-VPN gateway(s) and agents according to the SIP specification. Once the session is established the tunnel is available to be utilized and may be used by the end devices to transfer data.

Upon receipt of the SIP OK, the SIP agents 26 will notify their respective applications that the network VPN has been successfully established (13). Optionally, the SIP Agents may include transfer information, such as bandwidth information, where that information is different than the request information contained in the initial API. Upon receipt of the network VPN confirmation (13) the first application will transmit data to the second application over the network VPN tunnel (14, 15, 16).

When the application is finished transmitting data, it terminates the call by issuing a SIP terminate and releases the VPN resources reserved in the MPLS core.

In addition to its role in creating and reserving network VPN services on demand, the S-VPN gateway may also perform additional services on the network. For example, the S-VPN gateway may perform address translation to hide the address of the associated application, and may evaluate the service level agreement to see if the requesting application has sufficient contracted resources to accommodate the network VPN services request. Additionally, the S-VPN may interface with or include an Authentication, Authorization, and Accounting (AAA) server to enable it to authenticate the identity of the requesting application, determine authorization associated with the requesting application, and establish accounting entities associated with the requested service to enable charges for the requested services to be applied to the requesting application.

Figure 3:
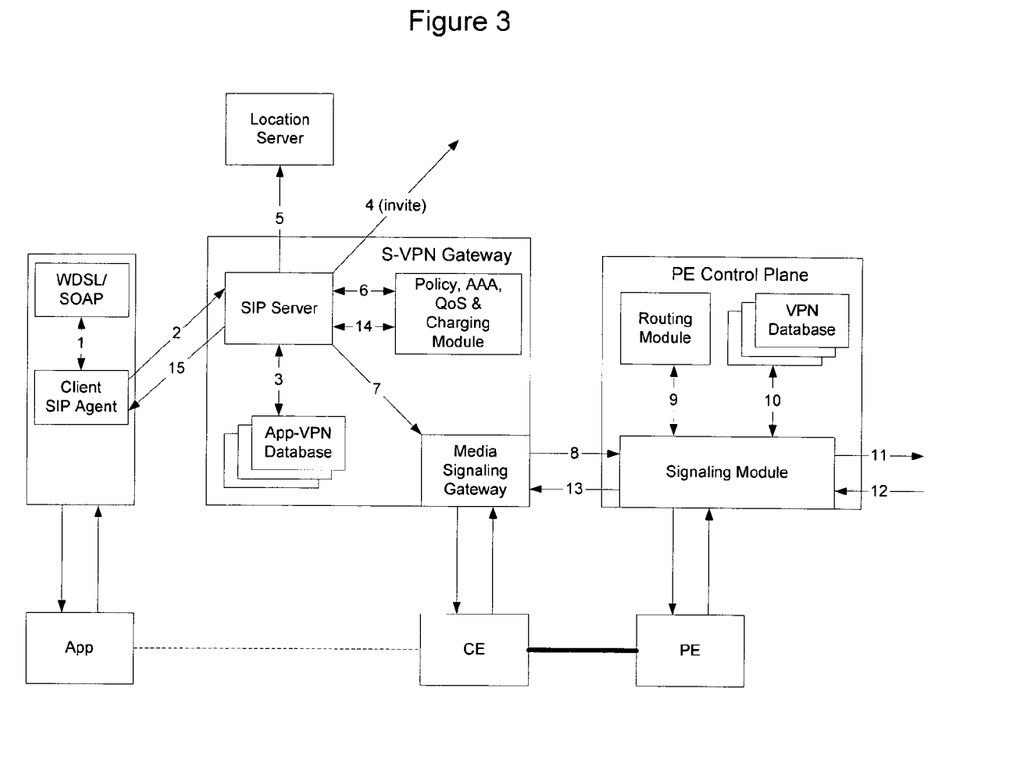
FIG. 3 is a functional block diagram illustrating signaling that may take place in the control plane of various network devices according to an embodiment of the invention.

FIG. 3 illustrates signaling plane exchanges between network devices configured to implement an embodiment of the invention. As shown in FIG. 3, when an end user network device running an application such as a Grid application desires to access network VPN resources, the end user network device (which also operates as the SIP client in this embodiment) issues a request to an associated SIP agent using a conventional protocol, such as Web Services Description Language (WSDL) or Simple Object Access Protocol (SOAP) (arrow 1).

The SIP agent issues a SIP invite message (2) to a S-VPN gateway. The S-VPN gateway accesses application—VPN databases to determine which VPNs are associated with the application that caused the SIP agent to issue the invite (3).

The S-VPN gateway, according to one embodiment of the invention, performs address management services for both the SIP naming space and the VPN naming space, and performs the necessary translations, lookups, and other functions on behalf of the network participants. To facilitate these services, the S-VPN gateway maintains several tables to allow it to manage the mapping between SIP session and VPN, between application and VPN, and various other aspects associated with VPN services to be provided to the application. For example, in one embodiment of the invention, the S-VPN includes a set of tables/databases containing information such as:

SIP Session—VPN Tunnel;
SIP Component—VPN Group;
Session/tunnel status;
Many-to-one mapping between SIP session and VPN tunnel;
Session QoS to VPN QoS;
Session address to VPN address; and
Session control to VPN control;
Security policies to VPN service; and
VPN service charge records.

These tables enable the S-VPN to establish tunnels, maintain the tunnels, and monitor traffic over the tunnels to maintain the tunnels while being used.

To issue a SIP call, the S-VPN gateway needs to know the address of the target application, or at least of the next S-VPN that will handle the SIP call on behalf of the target application. If the S-VPN gateway knows the address it may issue the call directly by issuing a SIP invite (4). Where this information is not available, the S-VPN engages in SIP component discovery (5) to obtain the required information prior to issuing the SIP invite (4). Where the target application has not registered with a S-VPN agent, and hence is not registered with the location server 32, the S-VPN may obtain target application VPN information and network resource information using a standard network VPN discovery, and network resource discovery protocol.

The S-VPN gateway may also perform various services on the network (6) to ensure that the VPN resource request is valid, such as by ascertaining AAA information associated with the request, applying policy, evaluating whether there are sufficient bandwidth resources available to satisfy the requested/required QoS, and establishing accounting entries to enable the application ultimately to be charged for the services to be performed. Optionally, one or more of these additional services, such as the establishment of accounting entries, may be performed after the network VPN resources have been reserved (14).

On the network level, the S-VPN gateway must also establish a Label Switched Path (LSP) through the network, distribute labels for use on that path, and reserve resources along that path to enable the enterprise VPN application to send data to the EUND target. In this example, the established LSP can be either unidirectional or bi-directional, based on service requirements set forth in the SIP session request.

If the enterprise VPN application—VPN-ID pair has not yet been registered on the network, the new route will be distributed on the network using BGP as discussed above in connection with FIG. 1. If the application—VPN-ID pair has been registered, the S-VPN will use UNI signaling to cause a LDP call to be issued on the network to distribute labels to establish a LSP on the network as discussed above in connection with FIG. 2. Specifically, as shown in FIG. 3, the S-VPN gateway will issue a UNI signal via media signaling gateway (8) to the PE network device associated with the CE that will be handling the traffic on behalf of the initiating application. A signaling module in the PE control plane receives the UNI signal interfaces with the routing module to ascertain routing information associated with the request (9) interfaces with VPN databases to ascertain information associated with the VPN-ID (10). The PE signaling module then formats a LDP call and issues the LDP call on the network (11).

The LDP call is used to distribute MPLS labels along the LSP between the ingress PE network device and the egress network device, as determined by the PE network device from its routing module. RSVP-TE may be used to reserve bandwidth along this path in the network. Reserving bandwidth enables the network to guarantee bandwidth availability, quality of service (QoS), and other attributes associated with the LSP so that transmissions may be handled by the MPLS network in a predictable fashion. When it is notified that the LDP call has been successful (12), it responds with a message (13) to the media signaling gateway to notify the S-VPN that the requested resources are reserved.

Optionally, the S-VPN gateway may interface with its policy, AAA, QoS, and charging module (14) to ascertain if the network VPN resources should be provided to the initiating application. Interfacing with these control facilities at this stage enables the S-VPN to establish accounting entries only after the VPN resources have been provisioned and, may allow the network to respond with anticipated costs associated with the reserved resources. Interfacing with these control facilities earlier in the process, as described above, reduces network resource allocation where the requesting application fails to obtain approval from the control facilities. For example, the requesting application may be requesting bandwidth and/or QoS that exceeds its Service Level Agreement (SLA). In this instance the network may not agree to provide the requested network VPN resources. Similarly, the requesting application may not be able to authenticate itself sufficiently to access a particular network VPN, or may not be authorized to access the requested network VPN. Establishing this at an earlier stage minimizes setup costs associated with the network provider by filtering out requests that have been improperly requested.

The S-VPN may also participate in the VPN tunnel monitoring and management to monitor use of the VPN tunnel and meter bandwidth usage on the tunnel. Monitoring bandwidth enables the S-VPN gateway to enter use-based information in the accounting entries to properly charge for use of the VPN resources.

After the LSP has been established and resources have been reserved, the label mapping is returned to the S-VPN gateway which will be used by the initiating application or associated CE to place traffic onto the tunnel through the network.

Accordingly, there are two conceptual steps that occur. First, the S-VPN gateway distributes routes associated with VPN-IDs to enable the PEs to establish network VPN tunnels. Second, the S-VPN gateway interfaces with the other SIP servers and network devices to allocate bandwidth over the network VPN tunnels on demand. From an application standpoint, both of these conceptual steps are associated with one or more SIP calls, thus enabling the application to utilize standard SIP signaling to obtain access to network VPN resources. While an embodiment of the invention has been described as using SIP to request resources, BGP to distribute routing information, and UNI/LDP/RSVP to secure network resources to fulfill the network VPN requests, the invention is not limited to this example as many other protocols may be utilized and the invention is not limited to an embodiment formed to function using only the above-listed protocols.

Figure 4:
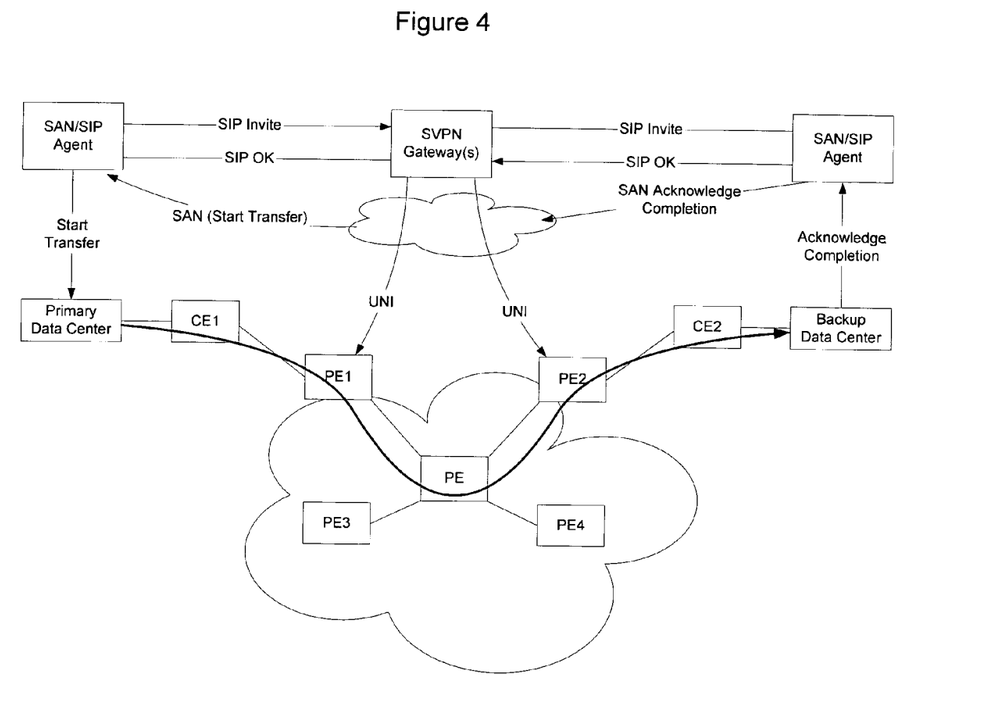
FIG. 4 is a functional block diagram of an example of how an embodiment of the invention may be used to transfer information between two participants in a storage area network.

Several examples may be instructive to understand the nature and manner of operation of the S-VPN gateway according to embodiments of the invention. FIG. 4 illustrates one such example, in which a storage area network seeks to transfer data across a communications network from a primary data center to a backup data center.

Initially, when the primary and backup data centers are connected to the communication network, they register with the S-VPN gateway. VPN-ID and route information is passed from the S-VPN gateway to the communication network to enable the routing information and VPN tables on the network devices to be updated to include the new route information.

When the primary data center is ready to transfer data to the backup data center, or is ready to schedule a transfer of data to the backup data center, the primary data center creates an API containing information associated with the transfer, such as the amount of data to be transferred, the bandwidth required, the quality of service required, the estimated duration of the transfer, and any other pertinent information. The API is received by the SAN/SIP agent which initiates a SIP session by sending a SIP invite to the S-VPN gateway. The S-VPN gateway receives the SIP invite and communicates with the relevant PE network devices to cause them to reserve bandwidth on the communication network for the requested transfer. The reservations may take place using LDP/RSVP as described above.

When the network resources have been reserved, the S-VPN gateway issues a SIP invite to the SAN/SIP agent for the backup data center. If the backup data center is able to participate in the transfer, it acknowledges the SIP invite and instructs its SAN/SIP agent to issue a SIP OK. The S-VPN gateway then issues a SIP OK to the SAN/SIP agent associated with the primary data center and the SAN/SIP agent instructs the primary data center to begin transfer of the data to the backup data center through its associated CE network device CE1.

Upon completion, the backup data center acknowledges completion of the transfer and the SAN/SIP agents and S-VPN gateway instruct the network that the network resources are no longer necessary. Thus, the network resources may be allocated to other uses and other users.

The mechanisms of how this takes place are shielded from the primary data center and secondary data center. Instead, as discussed above and in connection with FIGS. 1-3, the primary data center issues an API to the SAN/SIP agent indicating a need for resources. The primary data center receives back a message from the SAN/SIP agent when it is OK for the primary data center to start the transfer to the backup data center. After the transfer has completed, the primary data center receives a transmission acknowledgment from the backup data center. To the primary data center, therefore, network VPN resources are transparently available on-demand without requiring the application to be cognizant or aware of the network details.

Figure 5:
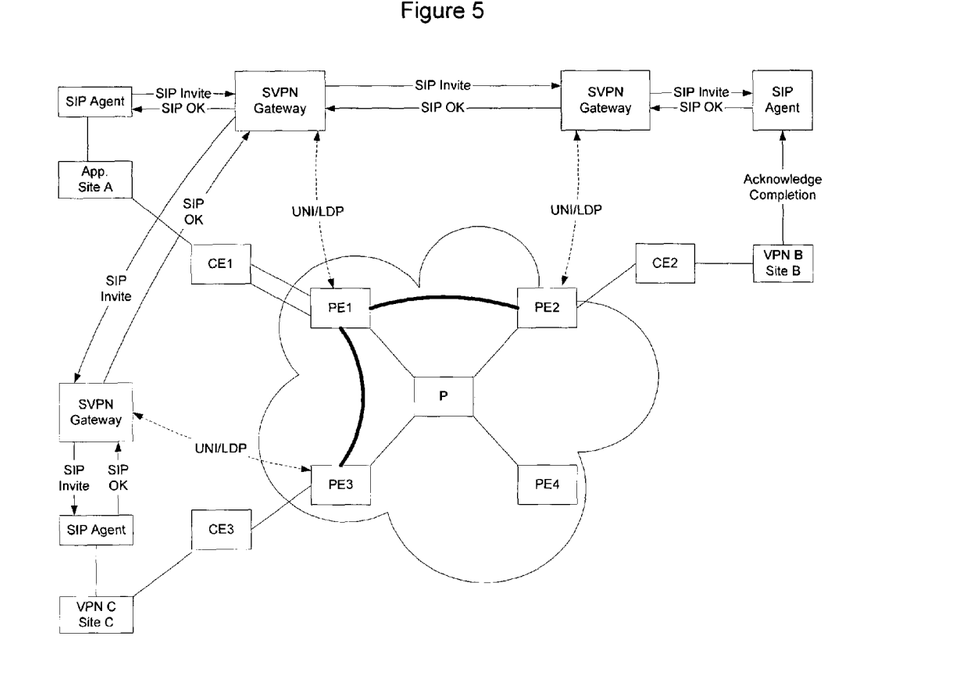
FIG. 5 is a functional block diagram of an example of how an embodiment of the invention may be used to transfer information between three enterprise VPN participants.

FIG. 5 illustrates another example of how an embodiment of the invention may be utilized. In this example, an application at site A would like to transfer information to site B using VPN B and to site C using VPN C. The Application in this embodiment, issues an API to the SIP agent containing the pertinent information for the transfer over VPN B and for the transfer over VPN C. The SIP agent passes this information into one or more SIP invite messages which are passed to the S-VPN gateway. The S-VPN gateway reserves VPN resources on behalf of the application for the transfers on the two VPNs, and issues SIP calls to the appropriate S-VPN agents for the sites. All of the details of how the signals are passed between the various participants are the same as discussed above, except that the S-VPN gateway is handling multiple requests for a given application at the same time.

In the embodiments illustrated above, a single S-VPN gateway has been illustrated as providing S-VPN services to a given site. The invention is not limited in this manner, as additional S-VPN gateways may also be configured to provide redundancy should there be a problem with the primary S-VPN gateway or with obtaining access to the primary S-VPN gateway.

The S-VPN gateway may be located at any convenient location on the network. For example, a service provider will generally maintain a centralized VPN management center to manage VPN services for subscribers. The VPN management center generally functions to configure the CE network devices, handle communications between VPN customers and the service provider, monitor the status of the VPN networks, and provide any other services necessary or convenient to the VPN network and customers. Optionally, the S-VPN gateway may be collocated with the service provider's VPN management center to facilitate communications between the S-VPN gateway and the other devices in the VPN management center, although the invention is not limited in this regard.

Although the invention has been discussed in connection with transferring information over MPLS LSPs, the invention is not limited to this embodiment. In an embodiment where Virtual Router (VR)-based VPN tunnels are to be used to transfer data between sites, the packets to be transmitted may be encapsulated using a protocol such as Generic Routing Encapsulation (GRE), which allows an arbitrary network protocol A to be transmitted over any other arbitrary network protocol B, by encapsulating the packets of A within GRE packets, which in turn are contained within packets of B. The type of encapsulation or encryption to be used for the VPN may be communicated between the end points using a tunnel type attribute.

Figure 6:
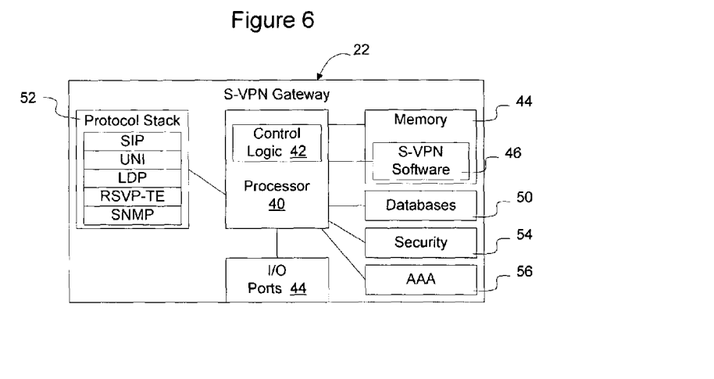
FIG. 6 is a functional block diagram of a S-VPN gateway network device according to an embodiment of the invention.

FIG. 6 illustrates one embodiment of a network device configured to implement a S-VPN gateway according to an embodiment of the invention. As shown in FIG. 6, the S-VPN gateway 22 in this embodiment includes a processor 40 containing control logic 42 configured to implement the functions ascribed to the S-VPN gateway 22 discussed herein in connection with FIGS. 1-5. The S-VPN gateway may be a personal computer, server, or other processing device, capable of processing instructions to implement the functions of the S-VPN gateway 22 discussed herein. Alternatively, the S-VPN gateway may be embodied on a network device including a switch fabric or other hardware, firmware, and/or software, to enable the network device to perform functions commonly ascribed to a router or switch to enable the network device handle packet traffic over the VPNs. Network ports 44 are provided to enable the network device to receive data packets from the communications network and to output data packets onto the communications network.

The S-VPN gateway 22 may be a separate device/machine on the network. Alternatively, the S-VPN gateway 22 may be instantiated as a process on another network device. The invention is not limited to any particular implementation on the network. Likewise, the invention is not limited to a particularly type of processing apparatus or network device.

A memory 46 includes data and instructions to enable the processor to implement the functions ascribed to the S-VPN gateway 22 and contained in S-VPN software 48. The S-VPN software 46 interfaces with application-VPN tables 50 to allow the S-VPN to maintain a database of applications, VPN-IDs, and other attributes associated with network VPNs supported by the S-VPN. The application-VPN tables are discussed in greater detail above in connection with FIG. 3. A protocol stack 52 is provided to enable the processor to communicate with other network devices using established protocols. Specifically, in the illustrated embodiment, the protocol stack is configured to enable the S-VPN to communicate using SIP, UNI, LDP, RSVP-TE, and one or management protocols, such as Simple Network Management Protocol (SNMP) or Remote Monitoring (RMON).

The S-VPN gateway may include additional or alternate components/processes configured to facilitate deployment of the functionality ascribed to it herein. For example, the S-VPN gateway may include a security module 54, an AAA module 56, and other functional modules. The invention is thus not limited to a S-VPN gateway or a system employing a S-VPN gateway with only the enumerated components discussed herein, but rather extends to any S-VPN gateway performing the functions described herein and as set out in the claims.

The control logic 42 may be implemented as a set of program instructions that are stored in a computer readable memory within the network device and executed on a microprocessor, such as processor 40. However, in this embodiment as with the previous embodiments, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of obtaining network Virtual Private Network (VPN) services on demand in a MultiProtocol Label Switching (MPLS) communication network, the method comprising the steps of:
   receiving a Session Initiation Protocol (SIP) message containing a request for network VPN services from an initiating application, the SIP message containing the request for network VPN services containing VPN information; and
   registering the VPN information from the SIP message on the MPLS communication network to cause the MPLS communication network to reserve network resources to establish network VPN tunnels to provide the network VPN services.

2. The method of claim 1, wherein the step of registering uses Multi-Protocol Border Gateway Protocol (MP-BGP) to distribute routing information associated with the initiating application to the communication network.

3. The method of claim 1, wherein the request for network VPN resources comprises VPN information including requested bandwidth, duration, and quality of service.

4. The method of claim 1, further comprising signaling the request to the MPLS communication network.

5. The method of claim 4, wherein signaling the request to the communication network comprises instructing the communication network to reserve network VPN resources on a network VPN tunnel according to the VPN information.

6. The method of claim 1, further comprising forwarding a SIP invite message toward a destination application.

7. A computer-readable medium containing instructions for controlling at least one processor to perform a method of providing network VPN services on demand, the method comprising the steps of:
   using Session Initiation Protocol (SIP) signaling to register application-VPN-ID information associated with a first application on a communication network to reserve resources on the communication network; and
   interfacing with the communication network to obtain network VPN resources associated with the application-VPN-ID information upon receipt of a request for access to the network VPN resources from the first application.

8. The method of claim 7, further comprising the step of maintaining a mapping between the first application and the network VPN resources provided to the first application.

9. The method of claim 7, further comprising the step of receiving session initiation protocol (SIP) signaling from a SIP agent associated with the first application and to generate SIP signaling directed to a second application.

10. A Service-Virtual Private Network (S-VPN) gateway for obtaining network Virtual Private Network (VPN) services on-demand in a MultiProtocol Label Switching (MPLS) communication network, comprising:
   a Session Initiation Protocol (SIP) server configured to receive a SIP message containing a request for network VPN services, the SIP message containing the VPN information; and a media signaling gateway configured to register the VPN information from the SIP message on the MPLS communication network to cause the MPLS communication network to reserve network resources to establish the network VPN tunnels to provide the network VPN services over the MPLS communication network.

11. The S-VPN gateway of claim 10, wherein the SIP server is further configured to handle SIP signaling to enable the first application to request access to said network VPN services.

12. The S-VPN gateway of claim 11, further comprising a services module configured to provide authentication, authorization, and accounting services on the communication network.

13. The S-VPN gateway of claim 10, further comprising an application-VPN database configured to store information associating applications with network VPN resources on the communication network.

* * * * *